US006963220B2

(12) United States Patent
Momtaz et al.

(10) Patent No.: US 6,963,220 B2
(45) **Date of Patent: *Nov. 8, 2005**

(54) METHODS AND CIRCUITRY FOR IMPLEMENTING FIRST-IN FIRST-OUT STRUCTURE

(75) Inventors: Afshin Momtaz, Laguna Hills, CA (US); Xin Wang, Irvine, CA (US); Jun Cao, Irvine, CA (US); Armond Hairapetian, Glendale, CA (US); David Chung, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/749,965

(22) Filed: Dec. 31, 2003

(65) Prior Publication Data

US 2004/0156250 A1 Aug. 12, 2004

Related U.S. Application Data

(63) Continuation of application No. 09/956,374, filed on Sep. 17, 2001, now Pat. No. 6,696,854.

(51) Int. Cl.[7] .......... G11C 7/00
(52) U.S. Cl. .......... 326/37; 326/40; 365/221
(58) Field of Search .......... 326/37, 38, 39, 326/46; 365/221, 233

(56) References Cited

U.S. PATENT DOCUMENTS

| | | | | |
|---|---|---|---|---|
| 4,423,482 | A | 12/1983 | Hargrove et al. | |
| 4,803,654 | A | 2/1989 | Rasberry et al. | |
| 5,138,637 | A | 8/1992 | Fox | |
| 5,388,238 | A | 2/1995 | McHarg et al. | |
| 5,473,756 | A * | 12/1995 | Traylor | 710/57 |
| 5,761,735 | A | 6/1998 | Huon et al. | |
| 5,901,100 | A * | 5/1999 | Taylor | 365/219 |
| 6,055,285 | A * | 4/2000 | Alston | 375/372 |
| 6,098,139 | A | 8/2000 | Giacobbe et al. | |
| 6,101,329 | A | 8/2000 | Graef | |
| 6,218,860 | B1 * | 4/2001 | Lytle et al. | 326/41 |
| 6,327,207 | B1 * | 12/2001 | Sluiter et al. | 365/221 |
| 6,493,794 | B1 * | 12/2002 | Yamashita | 711/109 |
| 6,696,854 | B2 * | 2/2004 | Momtaz et al. | 326/37 |

* cited by examiner

*Primary Examiner*—Daniel D. Chang
(74) *Attorney, Agent, or Firm*—Christie, Parker & Hale, LLP

(57) ABSTRACT

Methods and circuitry for implementing high speed first-in first-out (FIFO) structures. In one embodiment, a FIFO is disclosed that allows the frequency of one clock, e.g., the write clock, to be different than (e.g., half) that of the other (read) clock. In another embodiment a FIFO is presented that can be set and/or reset asynchronously. Other embodiments are disclosed wherein the read and write pointers are effectively monitored to ensure proper timing relationship, to detect loss of clock as well as to detect other abnormal FIFO conditions.

19 Claims, 6 Drawing Sheets

METHODS AND CIRCUITRY FOR IMPLEMENTING FIRST-IN FIRST-OUT STRUCTURE

CROSS-REFERENCE TO RELATED APPLICATION(S)

This application is a continuation of application Ser. No. 09/956,374, filed Sep. 17, 2001 now U.S. Pat. No. 6,696, 854, the disclosure of which is incorporated herein by reference.

FIELD OF THE INVENTION

The present invention relates in general to integrated circuits, and in particular to method and circuitry for implementing high speed first-in-first-out (FIFO) structures.

BACKGROUND

FIFOs are used in a variety of circuit applications. For example, data communication circuits use FIFO structures to address different system timing requirements. A serializer, for example, employs an internal clock that may not be synchronized with an external clock used to supply data to the circuit. A FIFO is used to transfer the data from the external clock regime to the internal clock regime. Typically, such a FIFO includes a number of registers that operate in response to a write pointer and a read pointer. An external clock usually provides or controls the write pointer while an internal clock controls the read pointer. Even though the phase relationship between these two clock domains is arbitrary, conventional FIFO designs require the frequencies of the two clock signals to be the same. There are applications, however, that require one clock domain to be of different frequency compared to the other (e.g., the write clock frequency be half that of the read clock, or vice versa). Furthermore, FIFOs require additional control circuitry to ensure the correct timing relationship between the write pointers and the read pointers. For example, the FIFO pointers must be set to the correct initial positions upon start-up, and then reset when any one of a number of conditions occur (e.g., overflow, loss of write clock, etc.). Also, FIFO pointers need to be monitored for a number of different purposes including detection of overflow conditions, detection of loss of external (write) clock, abnormalities in pointer operation, etc.

There is a need for improved method and circuitry for implementing high speed FIFO structures that meet all of the above requirements.

SUMMARY

The present invention provides methods and circuitry for implementing high speed FIFO structures. In one embodiment, a FIFO is disclosed that allows the frequency of one clock, e.g., the write clock, to be different than (e.g., half) that of the other (read) clock. In another embodiment a FIFO is presented that can be set and/or reset asynchronously. Other embodiments are disclosed wherein the read and write pointers are effectively monitored to ensure proper timing relationship, to detect loss of clock as well as to detect other abnormal FIFO conditions.

Accordingly, in one embodiment, the present invention provides a FIFO that includes a plurality of registers; a write pointer circuit having an input that receives a write clock signal and a plurality of outputs that respectively couple to the plurality of registers, the write pointer circuit generates a write pointer signal at a first frequency; and a read pointer circuit having an input that receives a read clock signal and a plurality of outputs that respectively couple to the plurality of registers, the read pointer circuit generates a read pointer signal at a second frequency that is different than the first frequency. In a specific embodiment, the frequency of the write pointer signal is half of the frequency of the read pointer signal. In another embodiment, the FIFO further includes a programming circuit that is configured to programmably vary the frequency of the write pointer signal.

In another embodiment the present invention provides a method of operating a FIFO pointer circuit that includes coupling a plurality of shift registers in a circular fashion; and applying a rising edge and a falling edge of a pointer clock signal to clock inputs of the plurality of shift registers in an alternating fashion.

In a further embodiment, the present invention provides a FIFO pointer reset circuit that includes a clock present detector coupled to receive a read clock and a write clock and configured to generate a CKPRES signal indicating status of the write clock; and logic circuit coupled to receive a reset signal, the CKPRES signal, the write clock and the read clock, and configured to generate a write pointer reset signal and a read pointer reset signal in response thereto. More specifically, the logic circuit further receives a lock detect signal indicating phase status of the read clock, the lock detect signal being logically combined with other input signals to the logic circuit. The FIFO pointer reset circuit generates the write pointer reset signal and the read pointer reset signal to respectively reset a write pointer circuit and read pointer circuit when the CKPRES signal indicates loss of the write clock, or when the reset signal is asserted, or when the lock detect signal indicates a no-lock condition for the read clock.

In yet another embodiment, the present invention provides a method of resetting FIFO pointer circuits that includes detecting the presence of a write clock signal and generating a CKPRES signal; detecting the lock status of a read clock signal phase-locked loop and generating a LCKDET signal; receiving a reset signal; and logically combining the CKPRES, the LCKDET and the reset signal to reset the FIFO pointer circuits when the write clock signal is lost, or when the read clock is not locked, or when the reset signal is asserted.

In another embodiment, the present invention provides a write clock present detector for a FIFO circuit, the write clock present detector includes a read shift register having a first plurality of serially-coupled registers and configured to shift a read flag signal in response to a read clock; a write shift register having a second plurality of serially-coupled register and configured to shift a write flag signal in response to a write clock; and a logic circuit coupled to an output of the read shift register and an output of the write shift register, and configured to logically combine the write flag signal with the read flag signal to generate a write clock present detect output signal. In a specific embodiment, the first plurality of registers in the read shift register is larger in number compared to the second plurality of register in the write shift register.

In a further embodiment, the present invention provides a method of detecting the presence of a write clock for a FIFO circuit, the method including propagating a read flag signal through a read shift register in response to a read clock; propagating a write flag signal through a write shift register in response to the write clock; and comparing an output of the read shift register with an output of the write shift register to generate a write clock present output signal.

In another embodiment, the present invention provides a FIFO pointer circuit including a serial chain of N registers coupled in circle and configured to shift a pointer signal in response to a pointer clock; and a pointer malfunction detector having a logic circuit with N inputs respectively coupled to N outputs of the N registers, wherein, the logic circuit is configured to detect lack of the pointer signal or presence of multiple pointer signals.

The following detailed description and the accompanying drawings provide a better understanding of the nature and advantages of the FIFO circuitry according to the present invention.

DETAILED DESCRIPTION

With reference to the drawings various exemplary embodiments of the present invention will now be described in greater detail.

Figure 1:
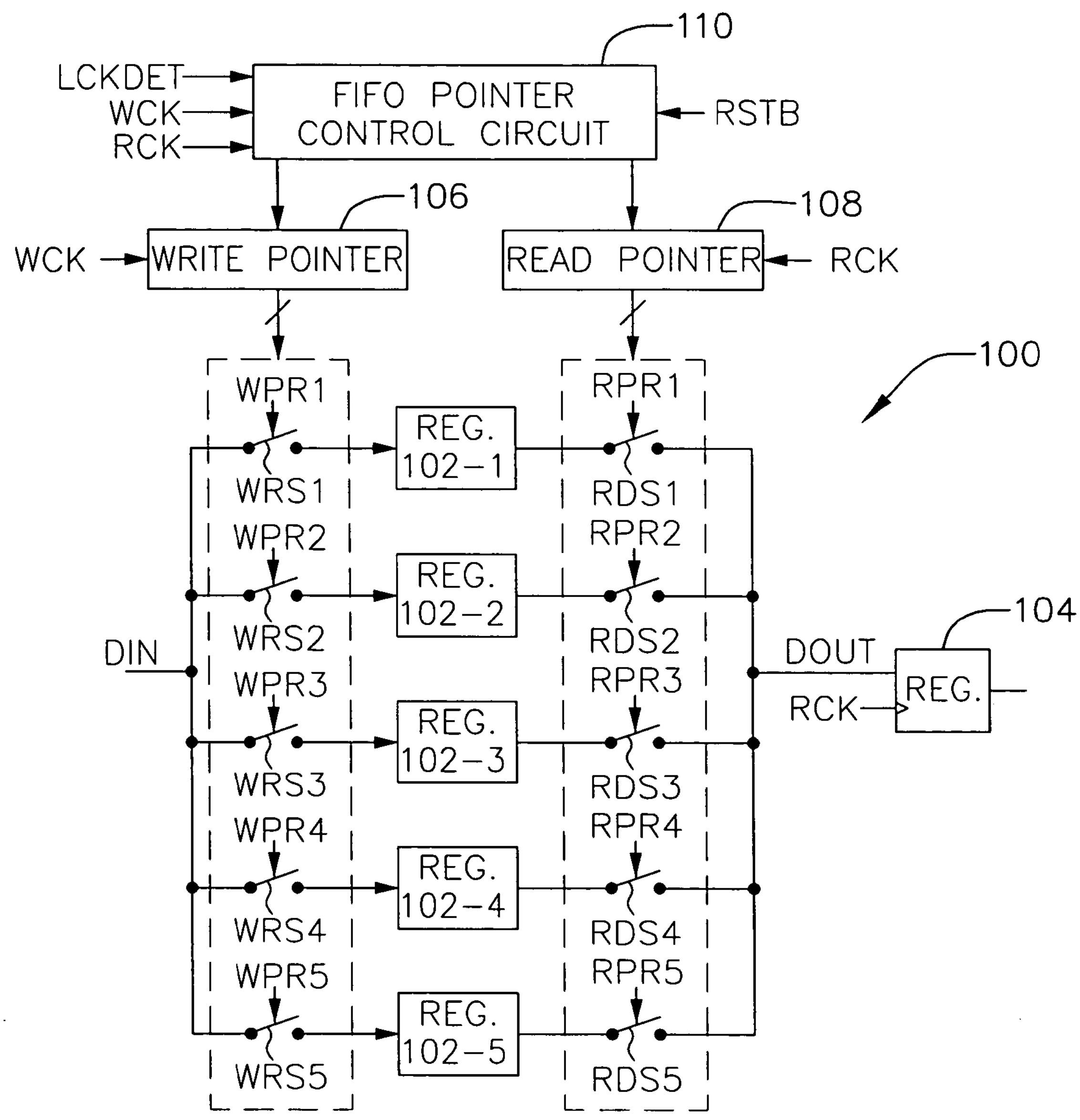
FIG. 1 is a simplified high-level block diagram of an exemplary five-register-deep FIFO circuit.

FIFO Pointer:

Referring to FIG. 1, there is shown a simplified high-level block diagram of an exemplary five-register-deep FIFO circuit 100. FIFO circuit 100 includes a set of five registers 102-1 to 102-5. It is to be understood that the FIFO of the present invention can have as many stages as desired, and that the 5-stage implementation is described herein for illustrative purposes only. Each of the registers 102-1 to 102-5 receives a data input DIN clocked in by respective write pointer signals WPR1 to WPR5. For illustrative purposes, write pointer signals WPR1 to WPR5 are shown as controlling pass switches WrS1 to WrS5, respectively. While this shows a logical depiction of the input circuit, signals WPR1 to WPR5 may be directly applied to clock inputs of registers 102 that may be implemented using, for example, D-type flip flops. The DIN signal would then directly couple to the D input of each register 102. In this embodiment, each register is updated at the falling edge of the corresponding write pointer signal (WPR1-5). The outputs of registers 102-1 to 102-5 connect to a data output node DOUT via read switches RdS1 to RdS5, respectively. Read switches RdS1 to RdS5 are controlled by read clock pointer signals R1 to R5, respectively. FIFO circuit 100 also includes a final register 104 that receives DOUT at its input. Register 104 operates to synchronize the timing of the signal on DOUT using the read clock RCK. FIFO circuit 100 further includes a write pointer circuit 106 that generates the write pointer signals WPR1-5 in response to write clock WCK. A read pointer circuit 108 generates read pointer signals RPR1-5 in response to read clock RCK. A FIFO pointer control circuit 110 receives certain control signals such as lock detect LCKDET and pointer reset RSTB, as well as write clock WCK and read clock RCK signals, and generates control signals for write pointer circuit 106 and read pointer circuit 108.

In operation, FIFO 100 translates the timing of the input data DIN from an external write clock WCK, which controls write pointer signals WPR1 to WPR5, to the internal read clock RCK, which controls read pointer signals RPR1 to RPR5. In most circuit applications read clock RCK and write clock WCK have the same frequency. There are applications wherein the input clock and the output clock may have different frequencies. For example, transceiver circuits developed for synchronous optical network (SONET) applications, are subject to standards set by the Multi-Source Agreement (MSA). In one specific application, this standard requires the transceiver to be able to operate with either a 311 MHz input clock or a 622 MHz input clock, and a 622 MHz output clock. Therefore, for a FIFO used in such a device, the conventional pointer circuit design would not satisfy this requirement.

Figure 2:
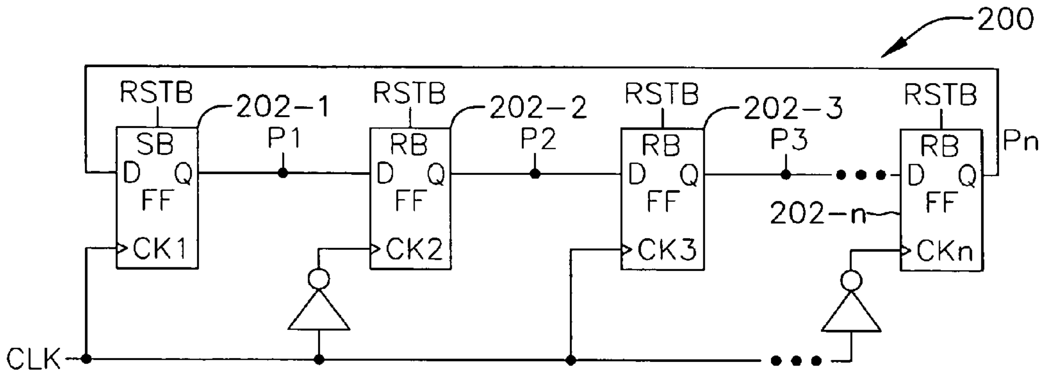
FIG. 2 shows a FIFO pointer circuit that operates at half the speed of the pointer clock according to one embodiment of the present invention.

FIG. 2 shows an exemplary pointer circuit 200, according to the present invention, that operates with both (falling and rising) edges of the input clock. Pointer circuit 200 includes a chain of N clocked registers or flip-flops 202-1 to 202-n that are serially connected with the output of the last one connecting to the input of the first one to form a ring. In this exemplary implementation, all flip-flops 202 have an active-low reset input RB except for the first flip-flop 202-1 that has an active-low set input SB. Thus, when a reset signal RSTB is applied to all of flip-flops 202, the outputs P2 through Pn of flip-flops 202-2 to 202-n are reset to logic low or "0", and output P1 of flip-flop 202-1 is set to a logic high or "1". Once the reset signal is removed (e.g., RSTB="1"), the logic "1" pointer signal shifts through the chain of flip-flops in response to a clock signal CLK. However, instead of directly applying input clock signal CLK to the clock input of each flip-flop 202, the circuit inverts clock signal CLK for every other flip-flop. Thus, given, for example, falling-edge triggered flip-flops 202, it takes two falling edges of the full-rate clock for the logic "1" pointer signal to propagate through one flip-flop 202. In this fashion the pointer circuit operates at half rate clock. The pointer circuit of FIG. 2 can be used as the write pointer circuit 106 in FIG. 1 for those applications where the input data is received at half the rate of the internal read clock.

Figure 3:
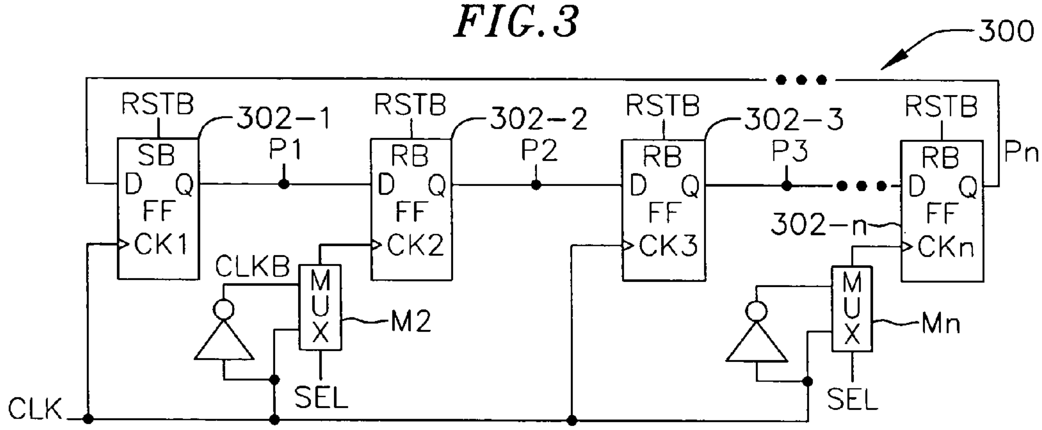
FIG. 3 shows a FIFO pointer circuit that can programmably operate at either half rate or full rate of the clock according to another embodiment of the present invention.

To provide the option of operating the pointer circuit at either half rate or full rate, as some applications may require, the present invention provides an alternative embodiment for a dual rate pointer circuit shown in FIG. 3. Pointer circuit 300 is similar in its construction to pointer circuit 200 with one modification. For those flip-flops that receive an inverted clock signal, the circuit adds a multiplexer that allows selection between an inverted clock signal or the non-inverted clock signal. Referring to FIG. 3, flip-flop 302-2 has its clock input CK2 connected to an output of multiplexer M2. Multiplexer M2 is a 2:1 selection circuit that receives CLK at one input and an inverted version of CLK (CLKB) at another. By applying a logic signal to the select input SEL of multiplexer M2, one of either CLK or CLKB is selected to drive the clock input CK2 of flip-flop 202-2. Thus, when full rate operation is required, SEL is set to a logic level that connects the output of multiplexers M2 to CLK. This results in all flip-flops 302 simultaneously receiving the same edge of CLK. On the other hand, when half rate operation is desired, SEL is set to a logic level that connects CLKB to the output of multiplexer M2. This results in half of the flip-flops receiving CLKB with the other half receiving KLB at their clock inputs, reducing the frequency of operation by half.

Figure 4:
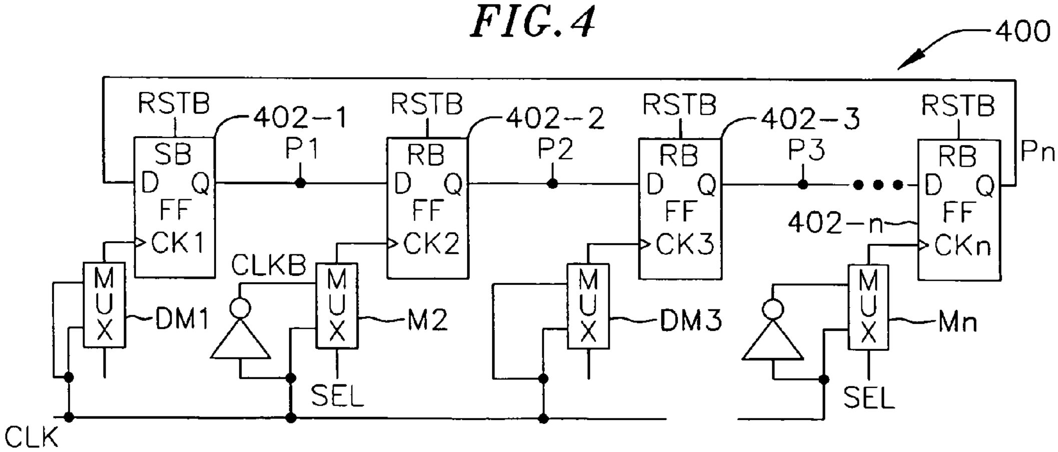
FIG. 4 shows the FIFO pointer circuit of FIG. 3 with additional delay matching circuitry according to an alternative embodiment of the present invention.

The inclusion of multiplexers at the clock input of one half of the flip-flops and not the other half, introduce delay mismatches that may adversely impact the operation of the circuit. FIG. 4 shows an alternative embodiment of a pointer circuit 400 wherein dummy multiplexers DMi have been inserted along the clock path of that half of the flip-flops that otherwise received CLK. signal directly. For each dummy multiplexer, both inputs connect together and to CLK and the SEL input is permanently tied to the logic signal that passes CLK to the clock input of the respective flip-flop. The purpose of the dummy multiplexers is to replicate the delay the circuitry introduces in order to match the delay along each individual clock line.

It is to be understood that the specific pointer circuits shown in FIGS. 2, 3 and 4 are exemplary and for illustrative purposes only, and that many variations will be known to those skilled in the art. For example, the logic polarities used in the various circuits such as set and reset inputs of the flip-flops or falling-edge versus rising-edge triggered nature of the flip flops, can be readily inverted with known circuit techniques. Furthermore, while the various embodiments shown provide half rate and dual rate pointer circuitry, similar principals can be used to provide further variations in the rate of operation. For example, instead of receiving an inverted version of the clock signal, the multiplexers can receive a signal that is ¼of clock signal CLK or any other fraction thereof. Multiplexers performing 3:1, 4:1 or higher can be used to provide for selection of multiple rates of operation. Also, the number of flip-flops that receive a different clock signal need not be half the total, and any combination can be used to achieve a desired rate of operation.

To ensure proper operation of a FIFO, not only do the individual pointer circuits must operate properly, correct timing relationship between the write pointer and the read pointer is essential. Referring back to FIG. 1, FIFO 100 includes a FIFO pointer control circuit 110 for providing the control functions that ensure proper operation of the FIFO. One function performed by control circuit 110 is the setting (or resetting) of FIFO pointers at the right position when necessary. For example, when the circuit is first powered up, read and write pointer circuits must first be reset to the correct start-up position. A reset may also be necessary during the operation of the FIFO when, for example, the external clock is for some reason lost. Depending on the application of the FIFO circuit other conditions may exist under which the pointer circuits may require resetting.

Figure 5:
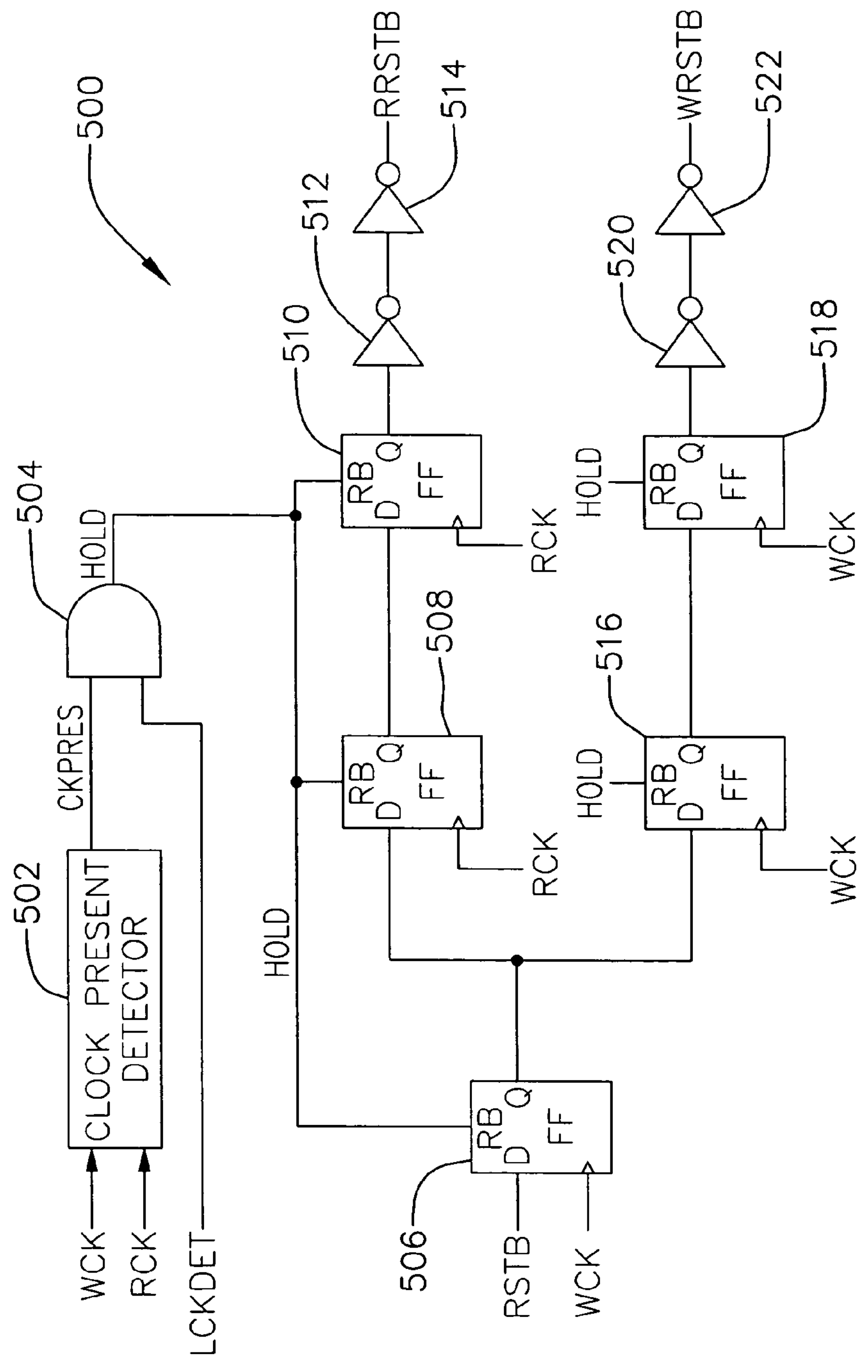
FIG. 5 shows a FIFO pointer reset circuit according to an exemplary embodiment of the present invention.
Figure 7:
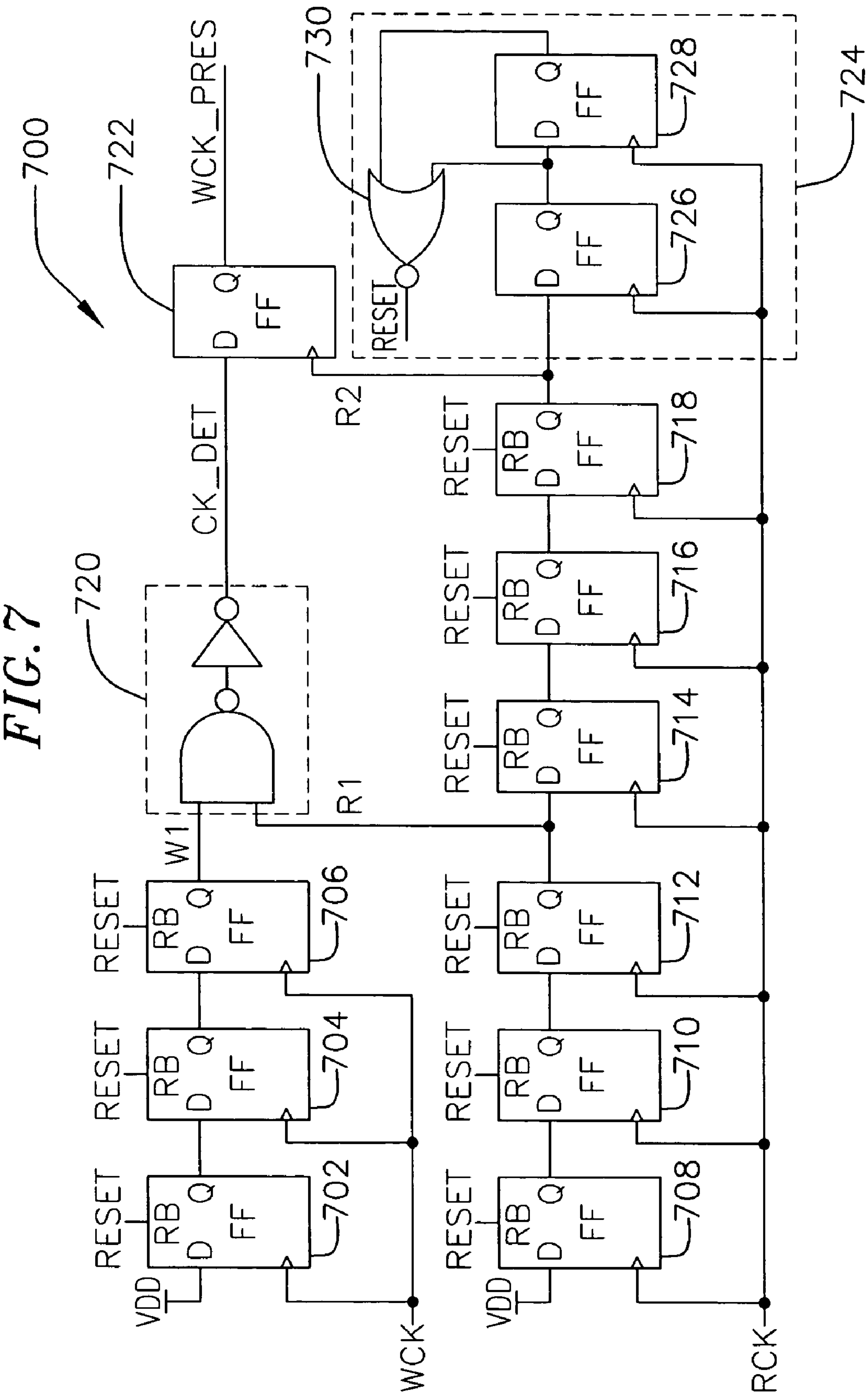
FIG. 7 shows an exemplary circuit implementation for a clock present detector according to the present invention.

FIFO Reset:

FIG. 5 shows a specific circuit implementation for an exemplary FIFO reset circuit 500. In this example, it is assumed that there are three control signals. The first is an external active-low reset control signal RSTB that may be, for example, under the control of the user. A second control signal is a lock detect signal LCKDET that indicates successful locking of a phase-locked loop (not shown) that is employed to reproduce a clean internal version of the external clock. A third control signal CKPRES is generated by a clock present detector 502 and detects when the external (write) clock is lost. Each of these control signals give rise to a condition that requires the resetting of the write pointer and the read pointer. To accomplish this, the circuit includes a clock present detector 502 that receives the external write clock WCK and read RCK as inputs and generates control signal CKPRES at an output. An exemplary implementation for clock present detector 502 is shown in FIG. 7 and described in greater detail below. An AND gate 504 receives signals CKPRES and LCKDET at its inputs and generates an output signal HOLD. Reset circuit 500 also includes a first flip-flop 506 that receives the external reset signal RSTB at its input and receives the signal HOLD at an active-low reset input RB. Flip-flop 506 is clocked by write clock WCK. Flip-flop 506 thus operates to align external control signal RSTB to on-chip write clock. The read pointer reset is accomplished by a serially-coupled pair of flip-flops 508 and 510. Flip-flop 508 receives the output of flip-flop 506 at its D input, read clock RCK at its clock input, and HOLD signal at its RB input. Flip-flop 510 receives the output of flip-flop 508 at its input, read clock RCK at its clock input and HOLD at its RB input. A pair of inverters buffer the output of flip-flop 510 and generate an active-low read pointer reset signal RRSTB. The write pointer reset signal WRSTB includes a pair of serially-coupled flip-flops 516 and 518, followed by inverters 520 and 422 connected in a similar fashion to the read path.

FIFO pointer reset circuit 500 is designed to reset the read and write pointer circuits when any one of the three following conditions occurs: (1) when the external write clock is lost (CKPRES="0"); (2) when the phase-locked loop has not achieved a lock condition (LCKDET="0"); and (3) when the external reset signal RSTB forces a reset condition (RSTB="0"). In operation, a logic low at either LCKDET or CKPRES causes HOLD to go low resetting each of the flip-flops in reset circuit 500. A logic low received at the external reset signal RSTB also resets the outputs of all flip-flops within, e.g., two to three clock cycles. The external reset control provides the user with additional flexibility to ensure optimized timing. Because the read and write clock signals are not in phase, two serially-connected flip-flops 508 and 510 in the read path are used to ensure that meta-stable conditions are avoided. Serially-coupled flip-flops 516 and 518 in the write path are included to match the delay of their read path counterparts. Signals RRSTB and WRSTB are applied to the reset inputs of the chain of flip-flops in the FIFO pointer circuit (see, e.g., FIG. 2, 3 or 4). Accordingly, when asserted RRSTB and WRSTB release the FIFO pointers from the correct starting position. The releasing of the read pointer is synchronized with read clock RCK, while the releasing of the write pointer is synchronized with write clock WCK. It is to be understood that FIG. 5 provides but one exemplary implementation of reset circuitry and that variations are possible. For example, signal RSTB need not necessarily be an external signal and could be generated on-chip from other circuitry such as a FIFO overflow detector that may require the resetting of the FIFO pointers when specific conditions occur.

Figure 6:
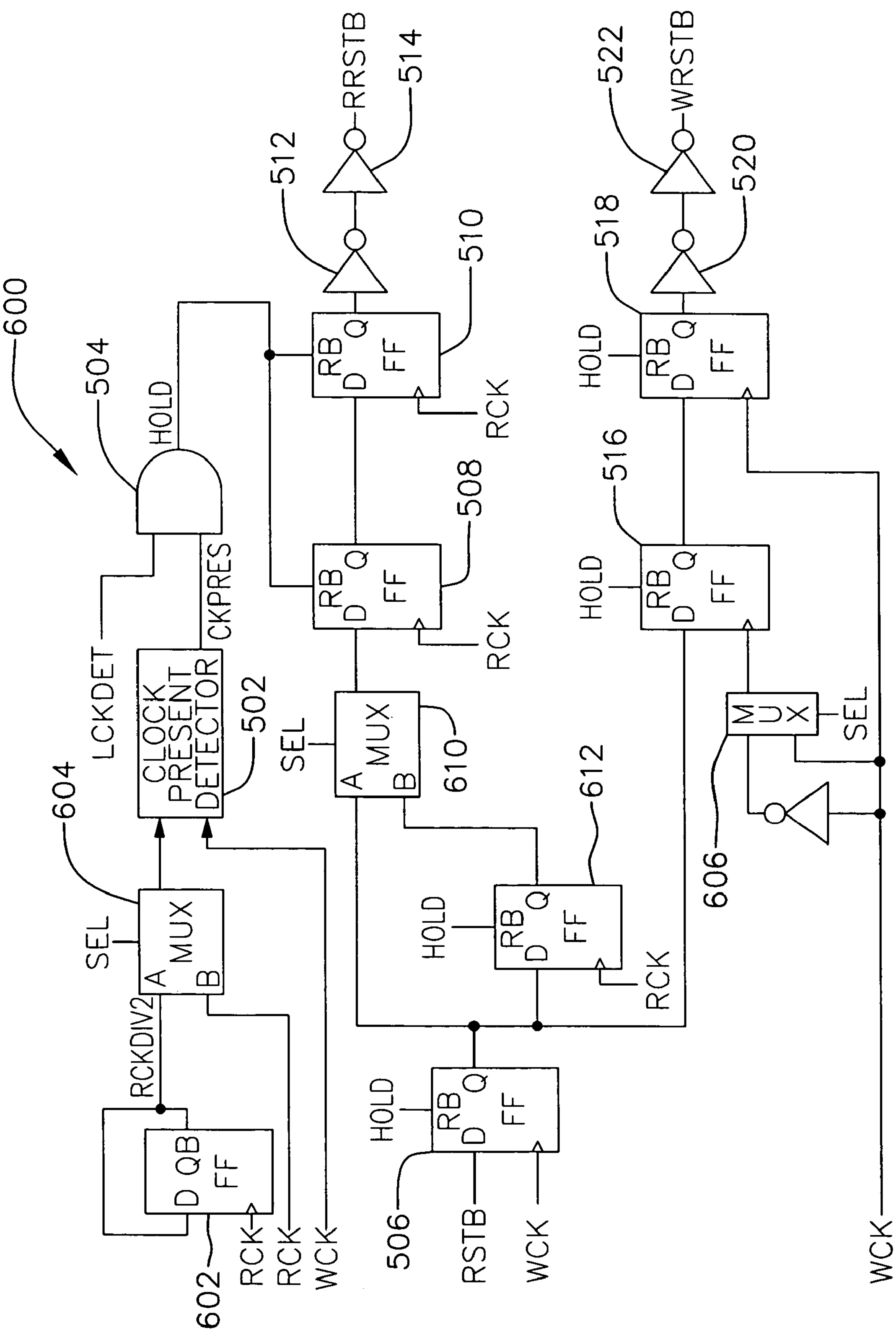
FIG. 6 shows an alternative embodiment for the FIFO pointer reset circuit of the exemplary circuit of FIG. 5.

FIG. 6 shows an alternative implementation for the pointer reset circuit that accommodates dual rate pointer circuits and shows other possible modifications. As the circuit of FIG. 6 is very similar to that shown in FIG. 5, the same reference numerals are used to refer to the same components. Pointer reset circuit 600 of FIG. 6 differs from that shown in FIG. 5 in that it can handle a dual rate read clock. A D-type flip-flop 602 has its QB output fed back to its D input to form a divide-by-two circuit. Flip-flop 602 receives read clock RCK at its clock input and divides the frequency by half to generate RCKDIV2. A 2:1 multiplexer 604 receives read clock RCK at one input and RCKDIV2 at another. A select input SEL selectively applies either RCK or RCKDIV2 to one input of clock present detector 502. Clock present detector 502 generates signal CKPRES, and AND gate 504 generates signal HOLD in the same fashion as in the circuit of FIG. 5. Another 2:1 multiplexer 606 connects at the clock input of flip-flop 516 in the write reset path. Multiplexer 606 allows for programmable selection between the falling edge and the rising edge of write clock signal WCK. In the same manner as in the dual rate FIFO pointer circuit shown in FIG. 3, the addition of this multiplexer reduces by half the frequency the reset signal at the output of flip-flop 506 is propagated through flip-flops 516 and 518. Similar to the circuit shown in FIG. 4, a dummy multiplexer (not shown) can be used at the clock input of flip-flop 518 to match delays.

In this embodiment of pointer reset circuit 600, along the read path a third flip-flop 612 is added that can be multiplexed in by multiplexer 610. As connected, when the A input of multiplexer 610 is selected the read path will operated with the two flip-flops 508 and 510 (as in the circuit of FIG. 5). When the B input of multiplexer 610 is selected, flip-flop 612 is inserted in series with the other two flip-flops. The option of adding an extra flip-flop enables the circuit to provide different delays in the read pointer reset path. This option allows the user to optimize alignment of read pointer reset signal RRSTB and write pointer reset signal WRSTB.

Clock Present Detector:

In another embodiment, the present invention provides an implementation for a clock present detector that can be used in, for example, the FIFO pointer circuits of the type shown in FIGS. 5 and 6. FIG. 7 shows one exemplary circuit implementation for a clock present detector 700. In this embodiment, read clock RCK is an internal signal that may be generated by a phase-locked loop, and is therefore always present. Read clock RCK is used to detect whether an external write clock WCK is or is not present. Detector 700 includes a read chain of serially-connected flip-flops and a write chain of serially-connected flip-flops. In the example shown, the write chain includes three D-type flip-flops 702, 704 and 706, with the first flip-flop (702) having its input connected to a logic high signal, such as the power supply voltage VDD. Write clock WCK is applied to the clock inputs of flip-flops 702, 704 and 706, the output of which is node W1. The read chain includes a similar set of three flip-flops 708, 710 and 712, with the first flip-flop (708) having its input connected to VDD, and all three receiving read clock RCK at their clock inputs. The output of flip-flop 712 is node R1. The read chain includes an additional set of three serially-connected flip-flops 714, 716 and 718 that connect in series with the first set of three flip-flops at node R1. The signals at nodes W1 and R1 are applied to an AND gate 720 the output of which, node CKDET, is applied to the D input of an output flip-flop 722. The clock input of output flip-flop 718 receives the output of the final flip-flop 718, node R2. A reset circuit 724 includes a couple of flip-flops 726 and 728 connected to the read chain with their outputs connected to a NOR gate 730. Reset circuit 724 generates a reset signal RESET for the flip-flops in the read and write chain.

In operation, the logic "1" at the input of flip-flop 708 is propagated through the read chain of flip-flops by read clock RCK. The logic "1" at the input of flip-flop 702 is propagated through the write chain of flip-flops by write clock WCK, assuming WCK is present. If write clock is present, after three cycles the write "1" reaches node W1 and waits until the read "1" reaches node R1. Once both R1 and W1 are asserted, AND gate 720 asserts node CKDET. The logic high CKDET remains at the D input of flip-flop 722 until the read "1" propagates through the three additional read flip-flops 714, 716 and 718. Once the read "1" reaches node R2, flip-flop 722 is clocked responding to its input CKDET. The output of flip-flop 722 thus goes high (WCKPRES="1") signaling the presence of the write clock. The purpose of the three additional flip-flops in the read chain is thus to provide some margin (in this example three read clock cycles) before WCKPRES signals the presence of clock. When there is no write clock signal present, the write "1" does not get propagated through the write chain of flip-flops and therefore node W1 is not asserted. This keeps CKDET low which in turn keeps WCKPRES low, signaling the lack of a write clock signal. To perform a continuous monitoring of the status of the write clock signal, this circuit is reset periodically. The reset occurs after the read "1" reaches node R2. One read clock cycle thereafter, the output of flip-flop 726 goes high causing RESET to go low. RESET is applied to the active-low reset input RB of all of the flip-flops in both the read chain and the write chain. Thus, when RESET goes low, the entire circuit is reset except for WCKPRES. The state of WCKPRES will change to low only if by the time the read "1" reaches R2, CKDET is still in a reset state. Such a condition would indicate that a previously present WCK signal has been lost.

It is to be understood that the specific implementation shown in FIG. 7 is for illustrative purposes only and that many variations for implementing this type of clock present detector are possible. For example, the number of flip-flops in each chain is arbitrary and is usually arrived at by a trade off between speed and accuracy. Similarly the number of additional flip-flops in the read chain is also arbitrary and may change depending on the circuit requirements. For example, the exemplary circuit of FIG. 7 shows a write chain that has one half as many flip-flops as the read chain. This number may be suitable for a FIFO pointer circuit that operates at full rate. For a half rate FIFO pointer circuit, circuit 700 may be designed with a write chain having one quarter as many flip-flops as the read chain. Thus the absolute and relative numbers of flip-flops depends on a number of different factors, including desired speed of operation, desired margin allowed for signaling detection, FIFO pointer circuit rate of operation, etc.

FIFO Pointer Abnormality Detector:

Another control function performed by FIFO pointer control circuit 110 of FIG. 1 is the monitoring of the FIFO pointer operation. As discussed above in connection with FIGS. 2, 3 and 4, a FIFO pointer circuit propagates a pointer flag (e.g., a logic "1" signal) through a ring of serially-connected flip-flops. Thus the pointer circuit malfunctions when there is no pointer flag found at the output any of the flip-flops, or when there are more than one flags present. Such abnormal conditions may be caused by glitches or clock jitter and the like. In another embodiment the present invention provides a circuit that simultaneously checks for both of these conditions.

Figure 8:
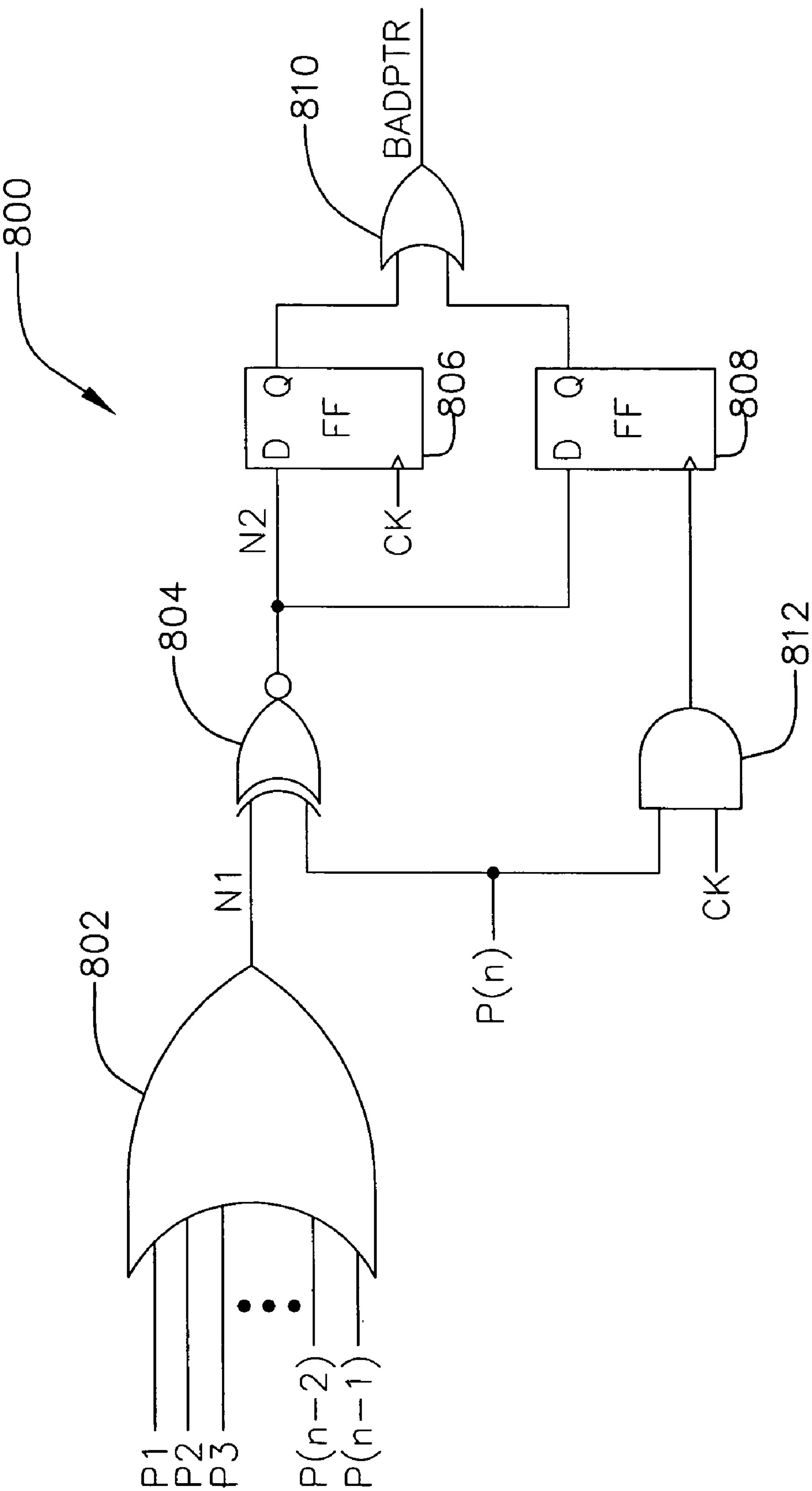
FIG. 8 shows an exemplary implementation for a pointer abnormality detector according to another embodiment of the present invention.

Referring to FIG. 8, there is shown an exemplary implementation for a pointer abnormality detector 800. Circuit 800 includes a large OR gate 802 that receives all but one of the outputs of the flip-flops in the pointer circuit. Using the pointer circuit shown in any of the FIGS. 2, 3, or 4, outputs P1 through P(n−1) may all be respectively applied to (n−1) inputs of OR gate 802. The output of OR gate 802, node N1, connects to one input of an exclusive NOR gate 804. The other input of exclusive NOR gate 804 receives the only other pointer output P(n) that was not connected to OR gate 802. The output of exclusive NOR gate 804, node N2, connects to the D input of flip-flop 806. The clock input of flip-flop 806 is clocked by, for example, a derivative of the read or write clock for each pointer circuit, respectively. Thus, if there is a malfunction of the type where no pointer flag is present (i.e., all pointer flip-flops have a logic "0" at their outputs), the output of OR gate 802 would be at a logic low (i.e., N1="0"). Because node P(n) would also be low, the output of exclusive NOR gate 804 would be asserted (N2="1"). Once clocked by CK, the output of flip-flop 806 would also be asserted resulting in BADPTR="1" which signals a "bad pointer" condition.

For the case where there may be more than one flag propagating through the pointer flip-flops, the output of OR gate 802 would be high (N1="1") due to one of the logic high flags. P(n) however may remain low as long as the one or more additional (errant) flags are among those that connect to the inputs of OR gate 802 (i.e., P1 to P[n−1]). But as the pointer flags propagate through the pointer circuit flip-flop chain in response to the clock signal, P(n) will eventually be asserted causing node N2 to go high. This in turn causes BADPTR to go high once flip-flop 808 is clocked. In this fashion, circuit 800 is able to detect both error conditions; the no pointer condition and the multiple pointer condition. Once again, the specific circuit shown in FIG. 8 is for illustrative purposes only, and variations are possible. For example, the one pointer output that is selected to directly connect to the exclusive NOR gate need not be the nth pointer and can be any one of the pointer outputs P1 to P(n). Also, whether an OR gate or an AND gate or any other type of logic gate is used for gate 802 may vary depending on the logic polarity of its input and the type of logic gate connected at its output. The same applies to the other logic gates including exclusive NOR gate 804, AND gate 812 and OR gate 810.

There are other control functions that may be provided in a FIFO circuit. For example, an overflow condition may occur when the read and write pointers occur at the same time. FIFO control circuitry is added to detect such conditions. An overflow detector detects the collision of write pointers and read pointers, generates a flag to reset the FIFO and thus preserves data integrity. An example of a FIFO overflow detector is described in detail in commonly-assigned U.S. patent application Ser. No. 09/772,781, entitled "Overflow Detector for FIFO," by Jun Cao, which is incorporated herein by reference in its entirety.

The present invention has thus provided various embodiments for a number of different circuits used in a FIFO structure, as well as methods of operating the same. Embodiments for half rate and dual rate FIFO pointers circuits, FIFO pointer reset circuits, clock present detector, and pointer abnormality detector are among the various inventions described herein. After reading and understanding the present detailed description, many modifications, variations, alternatives, and equivalents will be apparent to a person skilled in the art and are intended to be within the scope of this invention. Therefore, the specific embodiment described is not intended to be exhaustive or to limit the invention, and the invention is intended to be accorded the widest scope consistent with the principles and novel features disclosed herein, and as defined by the following claims.

What is claimed is:

1. A first-in-first-out circuit comprising:

a write pointer circuit coupled to receive a write clock signal and configured to generate a plurality of mutually exclusive write pointer signals in accordance with the write clock signal;

a read pointer circuit coupled to receive a read clock signal and configured to generate a plurality of mutually exclusive read pointer signals in accordance with the read clock signal; and a plurality of registers coupled to receive an input signal, the registers configured to store data from the input signal in accordance with the write pointer signals and configured to output data in accordance with the read pointer signals.

2. The first-in-first-out circuit of claim 1 wherein each of the registers is configured to receive a unique one of the write pointer signals from the write pointer circuit.

3. The first-in-first-out circuit of claim 2 wherein each of the registers is configured to receive a unique one of the read pointer signals from the read pointer circuit.

4. The first-in-first-out circuit of claim 1 wherein each of the registers is configured to receive a unique one of the read pointer signals from the read pointer circuit.

5. The first-in-first-out circuit of claim 1 wherein the write pointer circuit comprises a plurality of flip-flops serially coupled in a ring.

6. The first-in-first-out circuit of claim 1 wherein the read pointer circuit comprises a plurality of flip-flops serially coupled in a ring.

7. The first-in-first-out circuit of claim 1 comprising an output register coupled to receive the data output by the registers and configured to output data in accordance with the read clock signal.

8. The first-in-first-out circuit of claim 1 comprising a fifo pointer control circuit configured to generate signals for controlling the write pointer circuit and the read pointer circuit.

9. The first-in-first-out circuit of claim 8 wherein the fifo pointer control circuit is configured to receive control signals to generate the signals for controlling the write pointer circuit and the read pointer circuit.

10. The first-in-first-out circuit of claim 9 wherein the control signals comprise at least one of a lock detect signal, a pointer reset signal, the write clock signal and the read clock signal.

11. A method of synchronizing received data comprising:

receiving an input signal;

receiving a write clock signal associated with the input signal;

generating a plurality of mutually exclusive write pointer signals in accordance with the write clock signal;

storing data from the input signal into a plurality of registers using the write pointer signals;

receiving a read clock signal;

generating a plurality of mutually exclusive read pointer signals in accordance with the read clock signal; and reading data stored in the registers using the read pointer signals.

12. The method of claim 11 wherein each of the registers is configured to receive a unique one of the write pointer signals.

13. The method of claim 12 wherein each of the registers is configured to receive a unique one of the read pointer signals.

14. The method of claim 11 wherein each of the registers is configured to receive a unique one of the read pointer signals.

15. The method of claim 11 wherein the write pointer signals are generated by a plurality of flip-flops serially coupled in a ring.

16. The method of claim 11 wherein the read pointer signals are generated by a plurality of flip-flops serially coupled in a ring.

17. The method of claim 11 comprising generating an output data signal from the read data in accordance with the read clock signal.

18. The method of claim 11 comprising receiving control signals to control the generation of the write pointer signals and the read pointer signals.

19. The method of claim 18 wherein the control signals comprise at least one of a lock detect signal, a pointer reset signal, the write clock signal and the read clock signal.

* * * * *